US007994682B2

(12) United States Patent
Kimura et al.

(10) Patent No.: US 7,994,682 B2
(45) Date of Patent: Aug. 9, 2011

(54) BRUSH DEVICE FOR MOTOR

(75) Inventors: Ryoichi Kimura, Matsudo (JP); Yukio Takahashi, Matsudo (JP)

(73) Assignee: Mabuchi Motor Co., Ltd., Matsudo-shi (JP)

( * ) Notice: Subject to any disclaimer, the term of this patent is extended or adjusted under 35 U.S.C. 154(b) by 171 days.

(21) Appl. No.: 12/525,776

(22) PCT Filed: Jan. 18, 2008

(86) PCT No.: PCT/JP2008/050572
§ 371 (c)(1),
(2), (4) Date: Aug. 4, 2009

(87) PCT Pub. No.: WO2008/096581
PCT Pub. Date: Aug. 14, 2008

(65) Prior Publication Data
US 2010/0033053 A1  Feb. 11, 2010

(30) Foreign Application Priority Data
Feb. 6, 2007  (JP) .................................. 2007-026633

(51) Int. Cl.
H02K 13/00 (2006.01)
(52) U.S. Cl. ......................... 310/239; 310/242; 310/244
(58) Field of Classification Search .................. 310/239, 310/242, 244
See application file for complete search history.

(56) References Cited

U.S. PATENT DOCUMENTS

| | | | | |
|---|---|---|---|---|
| 931,415 A * | 8/1909 | Grant | ........................... | 310/244 |
| 3,296,473 A * | 1/1967 | Mabuchi | ........................ | 310/239 |
| 3,450,916 A * | 6/1969 | Mabuchi | ........................ | 310/244 |
| 4,746,829 A * | 5/1988 | Strobl | ............................. | 310/239 |
| 5,015,896 A * | 5/1991 | Wong | ............................... | 310/71 |
| 5,138,212 A * | 8/1992 | Wong et al. | .................. | 310/239 |
| 5,294,852 A * | 3/1994 | Straker | ...................... | 310/68 C |
| 6,339,272 B1 * | 1/2002 | Sato | ............................... | 310/87 |
| 6,445,104 B1 * | 9/2002 | Sato | .............................. | 310/239 |
| 6,603,235 B1 * | 8/2003 | Kimura | ........................ | 310/239 |
| 6,677,694 B1 | 1/2004 | Takei et al. | | |
| 6,768,243 B1 * | 7/2004 | Yamazaki et al. | ............ | 310/239 |
| 6,870,297 B1 * | 3/2005 | Kasdorf | ....................... | 310/239 |
| 6,924,577 B2 * | 8/2005 | Southall et al. | ............... | 310/239 |
| 2002/0047377 A1 * | 4/2002 | Sato | ............................... | 310/87 |
| 2002/0047468 A1 * | 4/2002 | Lee | ................................ | 310/239 |
| 2003/0117036 A1 * | 6/2003 | Uchida et al. | ................. | 310/239 |

(Continued)

FOREIGN PATENT DOCUMENTS
CN  1170353 C  10/2004
(Continued)

*Primary Examiner* — Quyen Leung
*Assistant Examiner* — Alex W Mok
(74) *Attorney, Agent, or Firm* — McGlew and Tuttle, P.C.

(57) ABSTRACT

Each of the paired brush devices includes a brush in sliding contact with a commutator, a brush arm holding the brush, and a brush base to which the brush arm is fixed and which has a base hole. The pair of brush devices are disposed such that a line connecting the centers of the pair of brushes inclines in relation to a line connecting the centers of a pair of magnets. Each of the brush arms of the brush devices is disposed on the outside of the corresponding brush base at a location where the brush arm is fixed to the brush base, and one of the brush arms is bent from the outside of the corresponding brush base toward the inside thereof while being passed through the base hole to intersect the brush base.

4 Claims, 4 Drawing Sheets

U.S. PATENT DOCUMENTS

2004/0245885 A1 * 12/2004 Bruhn et al. .................. 310/239

FOREIGN PATENT DOCUMENTS

| CN | 1183647 C | | 1/2005 |
| GB | 2094561 A | * | 9/1982 |
| GB | 2194687 A | * | 3/1988 |
| JP | 4-80255 | | 7/1992 |
| JP | 2000-224815 | | 8/2000 |
| JP | 2001-136712 | | 5/2001 |
| JP | 2003-324906 | | 11/2003 |

* cited by examiner

EXTERNAL TERMINAL INSERTION OPENING

BRUSH DEVICE FOR MOTOR

TECHNICAL FIELD

The present invention relates to a small-sized motor which can be used for motor-driven retraction and mirror drive of automotive mirrors, adjustment of optical axes of headlights, etc., and more particularly to a small-sized motor whose brush devices have improved characteristics.

BACKGROUND ART

FIGS. 7(A) and 7(B) show conventional brush devices for a small-sized motor, wherein FIG. 7(A) is a view showing, on an enlarged scale, one of the paired brush devices, and FIG. 7(B) is a view of a casing cover of the small-sized motor to which the brush devices are attached, as viewed from the interior of the motor (see Patent Document 1). The illustrated brush device is composed of a carbon brush to come into sliding contact with a commutator, a brush arm which holds the carbon brush pressed fitted thereinto, and a brush base coupled to the brush arm by means of staking. A central portion of the brush base is cut and raised so as to form a receptacle terminal. Therefore, a hole corresponding to the raised receptacle terminal is formed in the central portion of the brush base.

The conventional brush devices are press-fitted into the casing cover and held thereby. The casing cover has external terminal insertion openings into which external terminals are inserted for external electrical connection. Paired magnets (not shown) are disposed in the motor casing to be located on opposite sides with respect to the left-right direction of FIG. 7(B). The two brush arms extend approximately perpendicularly to a line connecting the centers of the magnets, from one of flat portions of the motor casing located on upper and lower sides, respectively, in FIG. 7(B). By virtue of such a configuration, despite the receptacle terminal having a sufficiently large length, a portion of the receptacle terminal which comes into contact with an external terminal can be provided at a position near the corresponding external terminal insertion opening. Therefore, the brush device can be applied in the case where the length of the external terminal is short.

However, because of an internal terminal structure using the receptacle terminal, the brush arm length, which is the distance from the brush arm fixed end to the brush position, cannot be increased. When the brushes wear, the brush arms turn about their fixed ends toward the commutator. In the case where the brush arm length is short, the turn angles of the brush arms become large when the brushes wear, raising a problem in that a phase shift (a deviation of a circumferential position at which electricity is supplied to the commutator, from an initial neutral position of each brush at which the brush initially comes into contact with the commutator) becomes large. Further, since the brush arm length is short, the brush arms deform when the brushes are opened during assembly of the motor (the brush arms are apt to cause permanent set). In addition, since the pressure under which the carbon brushes come into contact with the commutator changes more greatly when the carbon brushes wear, stable contact between the brushes and the commutator cannot be attained. Further, when external terminals are inserted, their tip end portions come into contact with the corresponding receptacle terminals in a sliding-up direction (a direction opposite the direction in which the receptacle terminals extend from the corresponding brush bases), and as a result the receptacle terminals may deform.

FIG. 8 is a view of conventional brush devices in which two carbon brushes are disposed such that a line connecting the carbon brushes inclines in relation to a horizontal center line (a magnet center line) (see Patent Document 2). Two brush arms extend approximately parallel to the flat portions of the motor casing. Although the carbon brushes are arranged along the inclined line, there is a limit to the extent to which the lengths of the brush arms can be increased, because the brush arms are approximately parallel to the flat portions. Further, in the case of the illustrated brush apparatus, when external terminals are inserted, their tip end portions may come into contact with the brush arms. Further, when the external terminals are inserted, their tip end portions come into contact with the corresponding receptacle terminals in the sliding-up direction, and as a result the receptacle terminals may deform.

Patent Document 1: Japanese Patent Application Laid-Open (kokai) No. 2001-136712

Patent Document 2: Japanese Utility Model Application Laid-Open (kokai) No. H4-80255

DISCLOSURE OF THE INVENTION

Problems to be Solved by the Invention

The present invention has been accomplished to solve the above-mentioned problems. An object of the present invention is to increase the brush arm length, which is the distance from the fixed end of each brush arm to the position of a corresponding brush, so as to reduce a phase shift produced when brushes wear; reduce a change in pressure with which the brushes come into contact with the commutator to thereby realize stable contact between the brushes and the commutator; and prevent deformation (permanent setting) of the brush arms, which deformation would otherwise occur when the brushes are opened during assembly of the motor.

Another object of the present invention is to enable external terminals to come into contact with corresponding receptacle terminals in a sliding-down direction, to thereby prevent deformation of the receptacle terminals.

Means for Solving the Problems

A brush device for a motor which includes a motor casing having a closed-bottomed hollow tubular shape and holding a pair of magnets attached to an inner circumferential surface thereof; a casing cover fixed to an opening portion of the motor casing and closing the opening portion; and a rotor composed of a multilayer core mounted on a shaft, a winding wound on the multilayer core, and a commutator mounted on the shaft, the brush device being each of paired brush devices attached to the casing cover. Each of the paired brush devices includes a brush in sliding contact with the commutator, a brush arm holding the brush, and a brush base to which the brush arm is fixed. A line connecting the centers of the pair of brushes inclines in relation to a line connecting the centers of the pair of magnets, and the brush arm and the brush base intersect each other. The brush arm and the brush base do not come into contact with each other at a location where they intersect each other. Each of the brush arms is disposed on the outside of the corresponding brush base at a location where the brush arm is fixed to the brush base, and one of the brush arms is bent from the outside of the corresponding brush base toward the inside thereof while being passed through a base hole formed in the brush base.

A motor according to the present invention comprises a motor casing having a closed-bottomed hollow tubular shape and holding a pair of magnets attached to an inner circumferential surface thereof; a casing cover fixed to an opening portion of the motor casing so as to close the opening portion and carrying a pair of brush devices attached thereto; and a rotor composed of a multilayer core mounted on a shaft, a winding wound on the multilayer core, and a commutator mounted on the shaft. Each of the paired brush devices includes a brush in sliding contact with the commutator, a brush arm holding the brush, and a brush base to which the brush arm is fixed and which has a base hole. The pair of brush devices are disposed such that a line connecting the centers of the pair of brushes inclines in relation to a line connecting the centers of the pair of magnets. Each of the brush arms is disposed on the outside of the corresponding brush base at a location where the brush arm is fixed to the brush base, and one of the brush arms is bent from the outside toward the inside of the corresponding brush base while being passed through the base hole.

Further, the brush devices include receptacle terminals formed integrally with the brush bases, and the casing cover includes external terminal insertion openings into which terminals for external electrical connection are inserted so as to be brought into contact with the receptacle terminals. Fixation of each brush device to the casing cover is performed at a fixing portion between the brush arm and the brush base, and a connection portion provided at the distal end of the brush base and integrated with a base portion of the receptacle terminal. Fixation of the connection portion to the casing cover is performed on the inner side of one of flat portions of the casing cover located on opposite side thereof, and the fixing portion between the brush arm and the brush base is disposed on a center line of the casing cover.

Effects of the Invention

According to the present invention, the brush arm length, which is the distance from the fixed end of the brush arm to the position of the brush, can be increased to thereby reduce a phase shift produced when brushes wear, and reduce a change in pressure with which the brushes come into contact with the commutator to thereby realize stable contact between the brushes and the commutator. In addition, deformation (permanent setting) of the brush arms can be prevented, which deformation would otherwise occur when the brushes are opened during assembly of the motor. Moreover, external terminals can be brought into contact with the corresponding receptacle terminals in the sliding-down direction, whereby deformation of the receptacle terminals can be prevented.

Further, even when the brushes are opened, the brushes or the brush arms do not come into contact with the corresponding brush bases. Moreover, since brush opening holes can be formed at symmetrical positions with respect to the center of the bearing held by the casing cover, the moldability of the casing cover is improved, and the dimensional accuracy of the bearing holding portion of the casing cover is improved. The fixing portion between the brush arm and the brush base is disposed on the center line of the casing cover. Therefore, a cumulative dimensional error can be decreased. That is, in the case of a conventional brush device, the cumulative dimensional error is the sum of the "dimensional error of the casing cover" and the "dimensional error of the brush arm." In contrast, the present invention can reduce the cumulative dimensional error (tolerance) to the "dimensional error (tolerance) of the brush arm" only. Accordingly, the accuracy of brush positions at which the carbon brushes come into sliding contact with the commutator can be increased.

BRIEF DESCRIPTION OF THE DRAWINGS

FIGS. 7(A) and 7(B) show conventional brush devices for a small-sized motor, wherein FIG. 7(A) is a view showing, on an enlarged scale, one of the paired brush devices; and FIG. 7(B) is a view of a casing cover of the small-sized motor to which the brush devices are attached, as viewed from the inside of the motor.

BEST MODE FOR CARRYING OUT THE INVENTION

Figure 1:
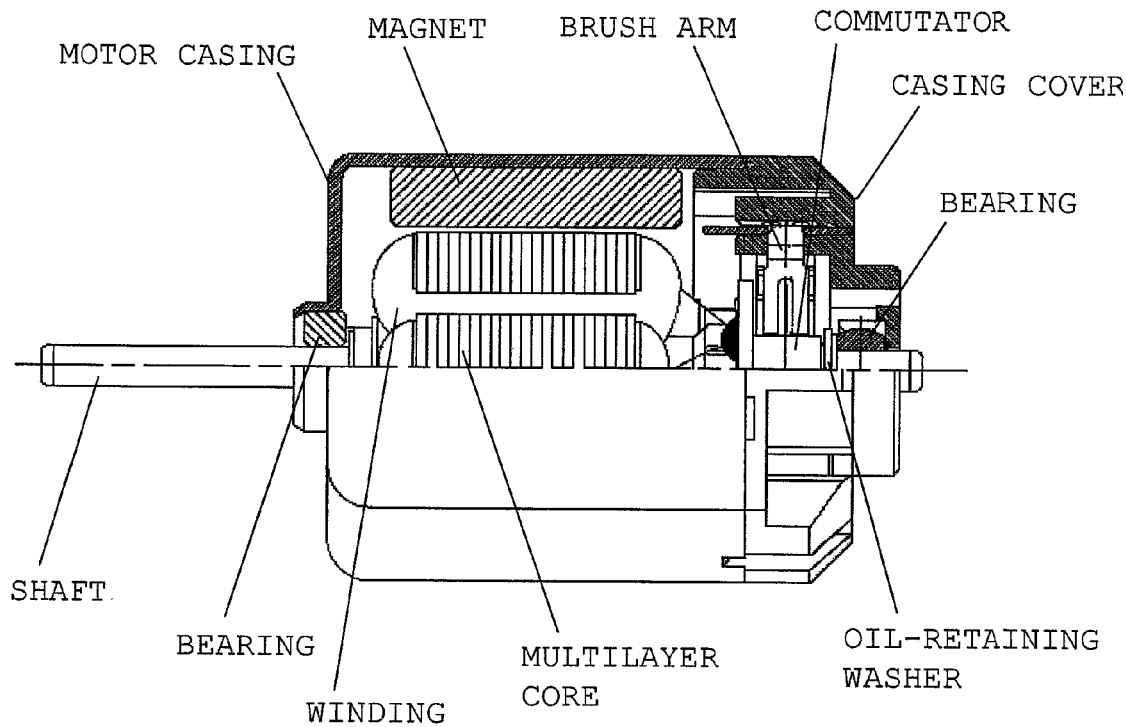
FIG. 1 is a vertical sectional view of an entire small-sized motor in which the present embodiment is embodied, with an upper half thereof shown in cross section.
Figure 2:
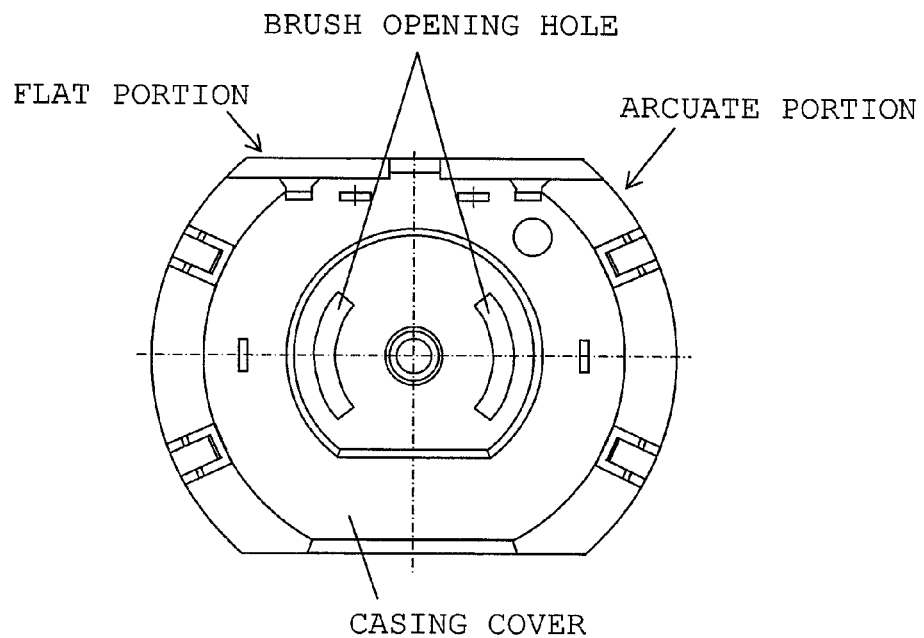
FIG. 2 is a view of a casing cover of the small-sized motor shown in FIG. 1 as viewed from the outside of the motor.
Figure 3:
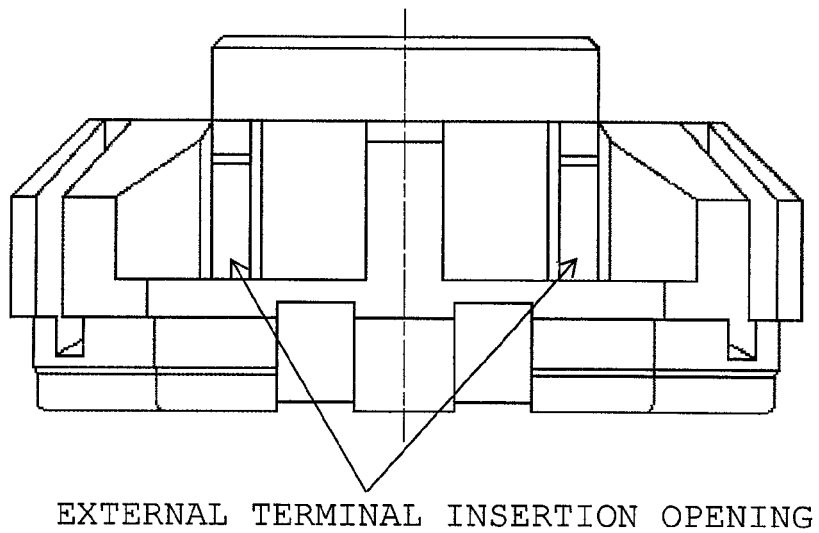
FIG. 3 is a view of the casing cover as viewed from the upper side of FIG. 2.
Figure 4:
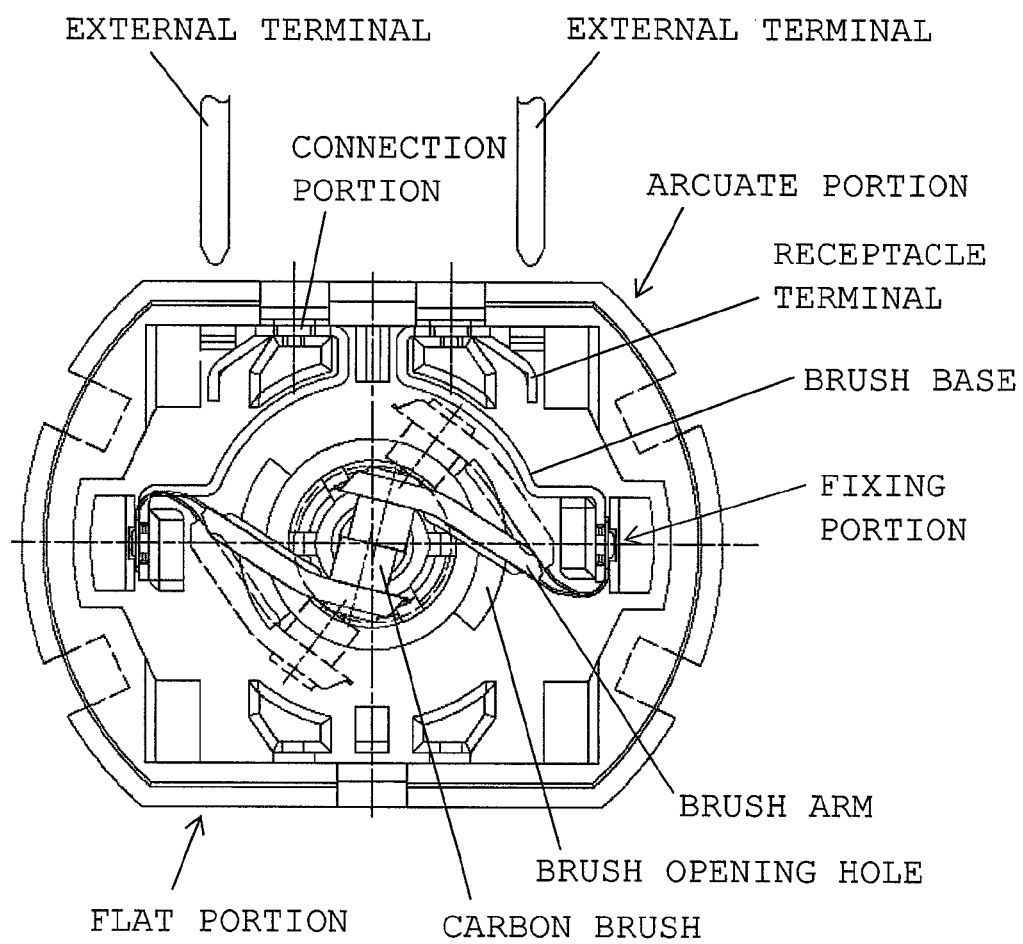
FIG. 4 is a view of the casing cover as viewed from the inside of the motor.
Figure 5:
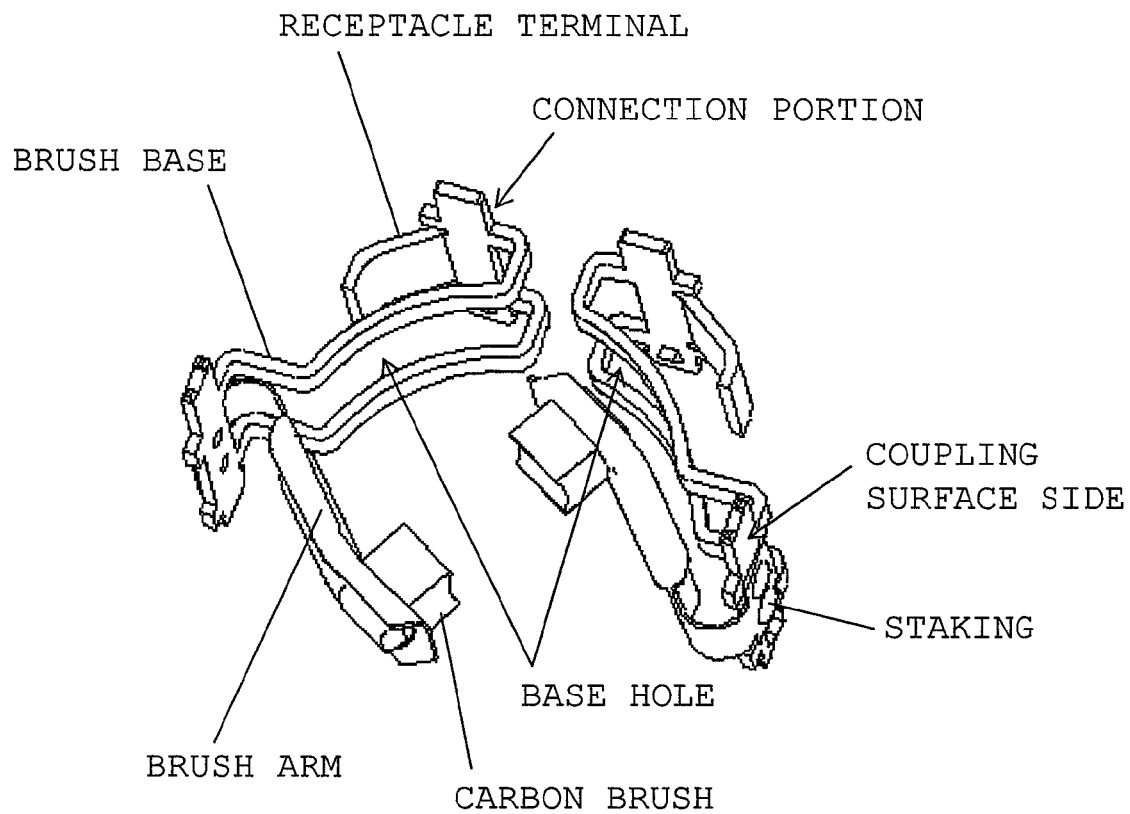
FIG. 5 is a view showing the pair of brush devices shown in FIG. 4.

The present invention will next be described with reference to illustrations. FIG. 1 is a vertical sectional view of an entire small-sized motor in which the present embodiment is embodied, with an upper half thereof shown in cross section. FIG. 2 is a view of a casing cover of the small-sized motor shown in FIG. 1 as viewed from the outside of the motor. Notably, the vertical direction in FIG. 1 corresponds to the lateral direction in FIG. 2. FIG. 3 is a view of the casing cover as viewed from the upper side of FIG. 2. FIG. 4 is a view of the casing cover as viewed from the inside of the motor. FIG. 5 is a view showing the pair of brush devices shown in FIG. 4.

A small-sized motor according to the present invention can employ the configuration of a conventional small-sized motor, except for brush devices and a casing cover to which the brush devices are attached. As shown in FIG. 1, a pair of magnets are attached to the inner circumferential surface of a motor casing formed from a metallic material into a closed-bottomed tubular shape. A casing cover formed from a synthetic resin is fitted to an opening portion of the motor casing. As shown in FIG. 2, the casing cover (the motor casing as well) has a circumferential wall composed of mutually facing flat portions and mutually facing arcuate portions which are connected continuously such that substantially flat surfaces are formed on opposite sides of the casing cover. In the present specification, a direction parallel to the flat portions; i.e., the lateral direction of the casing cover shown in FIG. 2, will be referred as the "longitudinal direction." The pair of magnets are disposed on opposite sides with respect to the longitudinal direction and attached to the inner circumferential surfaces of the arcuate portions of the motor casing. External terminal insertion openings are formed in one of the flat portions.

As shown in FIG. 1, a bearing for a shaft is accommodated in a central portion of the casing cover. The other end of the shaft is supported by a bearing provided at the center of a bottom portion of the motor casing having a closed-bottomed hollow tubular shape. Usually, a multilayer core, a winding wound on the multilayer core, and a commutator are mounted on the shaft, thereby forming a rotor of the miniature motor. As will be described in detail later, a pair of carbon brushes in contact with the commutator are supported and electrically connected to an external circuit such that brush arms supporting the carbon brushes are supported by the casing cover formed of a synthetic resin, and receptacle terminals formed integrally with brush bases establish electrical connection between the brush arms and the external circuit. An oil-retaining washer prevents oil impregnated in the bearing from flowing onto the commutator.

As shown in FIG. 5, each of paired brush devices is composed of a carbon brush to be in sliding contact with the commutator, a brush arm which holds the carbon brush fitted thereinto, and a brush base which is coupled with the brush arm through staking. This staking is performed by inserting projections which are provided on a coupling surface of the brush base located on the outer side (as viewed from the rotation center of the motor) into holes formed in the brush arm, and applying pressure to distal end portions of the projections to thereby crush the projections. A receptacle terminal is provided at an end portion of the brush base. That is, the receptacle terminal is integrated with the brush base via a connection portion. The brush base has a base hole having a width and a length sufficient to bend the brush arm, which has a predetermined width and a predetermined length, from the outside toward the inside of the brush base, in such a manner that the brush arm passes through the base hole, while intersecting the brush base, without coming into contact with the brush base. The brush base and the receptacle terminal, which are formed integrally, may be formed from a plate having a thickness of about 0.3 mm and made of a copper alloy (brass, nickel silver, phosphor bronze, or the like). The brush arm may be formed from a plate having a thickness of about 0.08 mm and made of beryllium copper. In order to thin down and secure the rigidity of the brush arm, which must have a high degree of resilience, opposite side edges of the brush arm are bent (box bending) outward (with respect to the rotation center of the motor). Since this box bending is performed before the brush arm is bent, the above-described base hole has a sufficient width to enable a die for boxing bending to pass through the base hole.

As described above, in order to enable the paired carbon brushes to be disposed along a line inclined in relation to a line connecting the centers of the magnets, the paired brush devices are not symmetrical with respect to the lateral or longitudinal direction. Both the brush devices are configured such that the brush arm is located on the outer side of the brush base at the staking portion. However, as shown in FIG. 5, the right-hand brush arm extends from the staking portion in a direction opposite the extending direction of the brush base (the brush arm extends downward, and the brush base extends upward). In contrast, the left-hand brush arm extends from the staking portion in the same direction as the brush base (both the brush arm and the brush base extend upward). Therefore, the left-hand brush arm is bent in a predetermined shape while being passed through the base hole of the brush base. Since the brush arm is bent from the outside of the brush base toward the inside thereof in such a manner that the brush arm intersects the brush base, even when a long external terminal is inserted, contact between the external terminal and the brush arm can be prevented.

Figure 6:
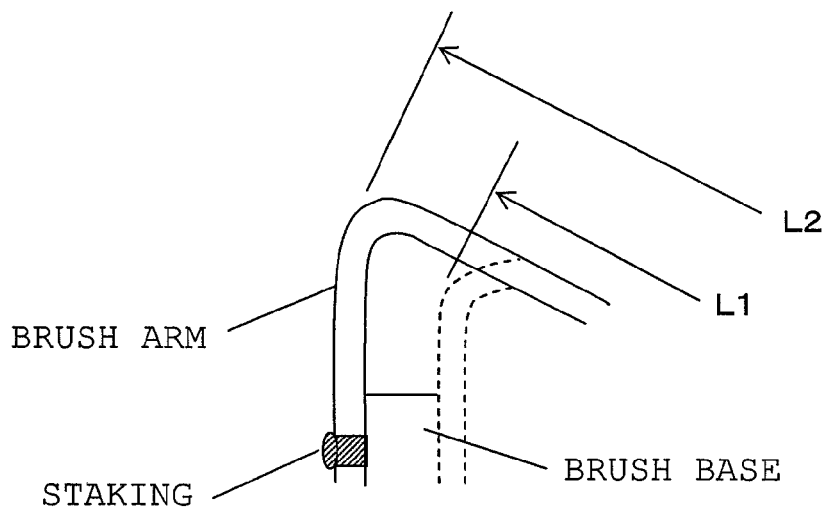
FIG. 6 is an explanatory view showing an effect attained by means of staking a brush arm in a state where the brush arm is disposed on the outer side of a brush base.
Figure 7A:
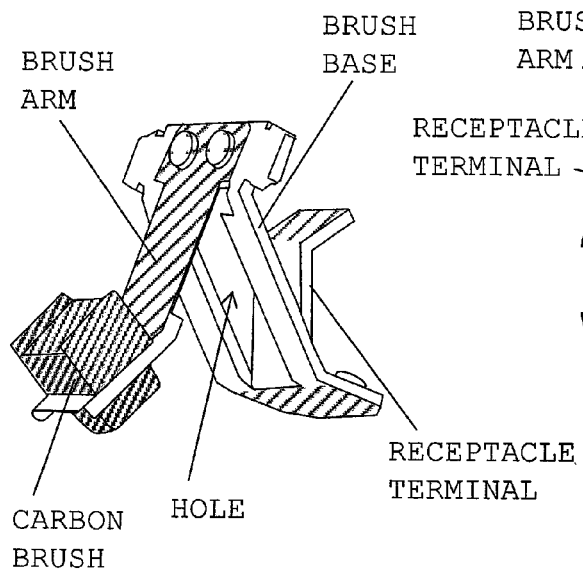
Figure 7B:
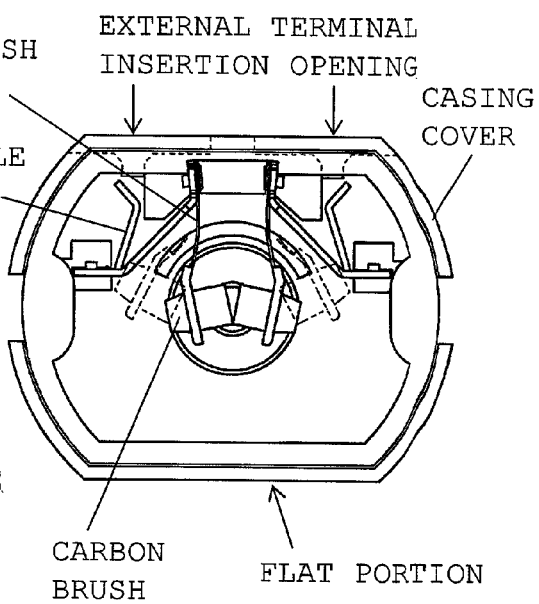
Figure 8:
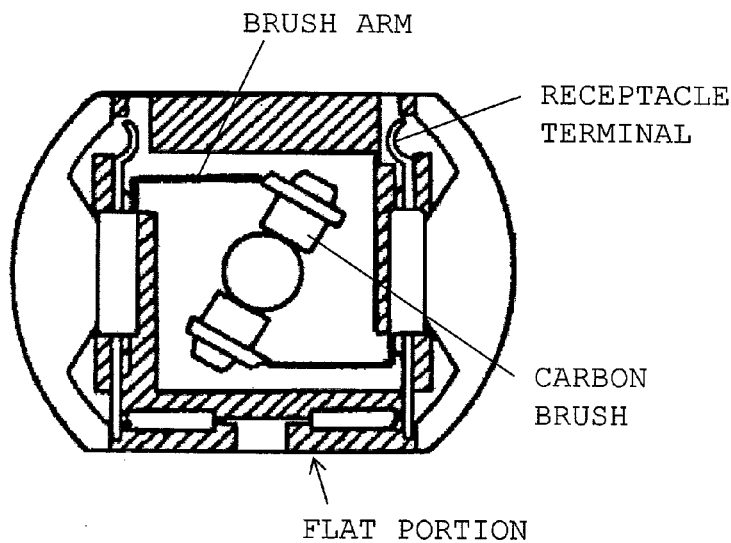
FIG. 8 is a view of conventional brush devices in which two carbon brushes are disposed such that a line connecting the carbon brushes inclines in relation to a horizontal center line.

FIG. 6 is an explanatory view showing an effect attained by means of staking the brush arm in a state where the brush arm is disposed on the outer side of the brush base. Although not illustrated in FIG. 6, a carbon brush is attached to the distal end of the brush arm. As compared with the case where the brush arm is disposed on the inner side of the brush base as indicated by a broken line and the brush arm has an action length L1 as measured from the carbon brush, the brush arm has an increased action length L2 when the brush arm is disposed on the outer side of the brush base. The brush arm shown on the right side of FIG. 5 does not require a base hole so as to be bent. However, through provision of a base hole, the shapes of the left-hand and right-hand brush devices can be rendered the same so as to improve productivity. Further, when the brushes are opened, the brushes can be retracted without causing interference.

A small-sized motor to which the present invention is applied is assembled through a process of passing the shaft, on which the rotor is integrally assembled, through the bearing at the center of the bottom portion of the motor casing, and attaching to the opening portion of the motor casing the casing cover to which the brush devices are attached. At that time, in some cases, an oil-retaining washer (FIG. 1) having a large diameter must be passed through the space between the paired carbon brushes. That is, at the time of motor assembly, a jig is inserted into brush opening holes (FIG. 2) so as to increase the distance between the paired carbon brushes. In FIG. 4, the carbon brushes which are in contact with each other before motor assembly are depicted by solid lines; and the carbon brushes which are opened for motor assembly are depicted by broken lines. Since the brush devices of the present invention have base holes, the carbon brushes opened wide at the time of assembly can be retracted into the base holes. Further, since the brush opening holes can be formed at symmetrical positions with respect to the center of the bearing held by the casing cover, the moldability of the casing cover is improved, whereby the dimensional accuracy of the bearing holding portion of the casing cover is improved.

As shown in FIG. 4, the brush devices having such a configuration are press-fitted into the casing cover and are held thereby. At that time, each of the brush devices is fixed at two locations; i.e., the staking portion between the brush arm and the brush base, and the connection portion provided at the distal end of the brush base and integrated with a base portion of the receptacle terminal. This fixation can be performed as follows. Projecting portions are integrally formed on the synthetic resin casing cover such that grooves for attachment are formed on the casing cover. The brush devices are press-fitted into the grooves, whereby the brush devices are fixed. Fixation of the connection portions provided at the distal ends of the brush bases and integrated with the base portions of the receptacle terminals is performed on the inner side of one of the flat portions of the casing cover provided on the opposite sides thereof. A pair of external terminal insertion openings are formed in the one flat portion at positions located outward of the fixing positions of the connection portions.

The illustrated brush devices are fixed to the casing cover at a position near the inner surface of the one flat portion such that the connection portion between the brush base and the receptacle terminal extends in the longitudinal direction. In addition, the staking portion between the brush arm and the brush base is disposed on the center line (the magnet center line of the motor) extending in the longitudinal direction of the casing cover and serving as a reference position when the brush devices are disposed. Therefore, a cumulative dimensional error of the carbon brush and the staking portion decreases. That is, in the case of a conventional brush device, the cumulative dimensional error is the sum of the "dimensional error of the casing cover" and the "dimensional error of the brush arm." In contrast, the present invention can reduce the cumulative dimensional error to the "dimensional error of the brush arm" only. Accordingly, the accuracy of brush positions at which the carbon brushes come into sliding contact with the commutator can be enhanced.

A line connecting the paired carbon brushes located on the commutator inclines in relation to a line connecting the centers of the paired magnets (a horizontal center line in FIG. 4). The inclination angle is desirably about 60° or about 120°.

Therefore, the brush arms are disposed such that the brush arms extend obliquely from the fixing portions on the center line extending in the longitudinal direction of the casing cover, whereby the lengths of the brush arms can be increased. Supply of electricity to the motor is performed by use of the paired external terminals which are inserted into the external terminal insertion openings (see FIG. 3) formed in the flat portion of the casing cover and brought into contact with the corresponding receptacle terminals. At that time, the external terminals are brought into contact with the receptacle terminals in the sliding-down direction; i.e., from the fixed ends (the connection portions) of the receptacle terminals toward the distal ends thereof. Therefore, the receptacle terminals are not deformed.

The invention claimed is:

1. A brush device for a motor which includes a motor casing having a closed-bottomed hollow tubular shape and holding a pair of magnets attached to an inner circumferential surface thereof; a casing cover fixed to an opening portion of the motor casing and closing the opening portion; and a rotor composed of a multilayer core mounted on a shaft, a winding wound on the multilayer core, and a commutator mounted on the shaft, the brush device being each of paired brush devices attached to the casing cover, characterized in that:

each of the paired brush devices includes a brush in sliding contact with the commutator, a brush arm holding the brush, and a brush base to which the brush arm is fixed; and a line connecting the centers of the pair of brushes inclines in relation to a line connecting the centers of the pair of magnets, and the brush arm and the brush base intersect each other.

2. A brush device for a motor according to claim 1, wherein the brush arm and the brush base do not come into contact with each other at a location where they intersect each other.

3. A brush device for a motor according to claim 2, wherein each of the brush arms is disposed on the outside of the corresponding brush base at a location where the brush arm is fixed to the brush base, and one of the brush arms is bent from the outside of the corresponding brush base toward the inside thereof while being passed through a base hole formed in the brush base.

4. A motor comprising a motor casing having a closed-bottomed hollow tubular shape and holding a pair of magnets attached to an inner circumferential surface thereof; a casing cover fixed to an opening portion of the motor casing so as to close the opening portion and carrying a pair of brush devices attached thereto; and a rotor composed of a multilayer core mounted on a shaft, a winding wound on the multilayer core, and a commutator mounted on the shaft, characterized in that:

each of the pair of brush devices includes a brush in sliding contact with the commutator, a brush arm holding the brush, and a brush base to which the brush arm is fixed; and the pair of brush devices are disposed such that a line connecting the centers of the pair of brushes inclines in relation to a line connecting the centers of the pair of magnets, and the brush arm and the brush base intersect each other.

* * * * *